United States Patent
Plaschko et al.

[11] Patent Number: 6,144,293
[45] Date of Patent: Nov. 7, 2000

[54] PROCEDURE FOR OPERATING A SECURITY SYSTEM

[75] Inventors: Heinrich Plaschko, Schwabach; Mathias Kuhn, Eckental, both of Germany

[73] Assignee: Temic Telefunkn microelectronic, Heilbronn, Germany

[21] Appl. No.: 09/181,759

[22] Filed: Oct. 29, 1998

[30] Foreign Application Priority Data

Oct. 29, 1997 [DE] Germany ............................ 197 47 654

[51] Int. Cl.⁷ ................................................ B60R 25/10
[52] U.S. Cl. .................... 340/426; 340/539; 340/825.31; 340/825.34; 307/10.2; 382/116
[58] Field of Search ...................... 340/426, 539, 340/425.5, 825.3, 825.31, 825.34; 283/69; 427/7; 307/10.2; 382/116

[56] References Cited

U.S. PATENT DOCUMENTS

| | | | |
|---|---|---|---|
| 5,581,630 | 12/1996 | Bonneau, Jr. ............................ | 382/116 |
| 5,616,966 | 4/1997 | Fischer et al. .......................... | 307/10.5 |
| 5,670,933 | 9/1997 | Hayashi .................................. | 340/426 |
| 5,867,802 | 2/1999 | Borza ...................................... | 701/35 |

FOREIGN PATENT DOCUMENTS

| | | |
|---|---|---|
| 11321 | 4/1995 | Australia . |
| 35 07 389 | 5/1986 | Germany . |
| 40 16 832 A1 | 11/1991 | Germany . |
| 4331300 | 3/1995 | Germany . |
| 44 24 735 A1 | 2/1996 | Germany . |

*Primary Examiner*—Daniel J. Wu
*Assistant Examiner*—Toan Pham
*Attorney, Agent, or Firm*—Venable; Norman N. Kunitz; Leo J. Jennings

[57] ABSTRACT

A security device (2) of a security system which a user can unlock by means of a transmitter unit (1) normally can also be unlocked by unauthorized users utilizing the transmitter unit (1). The new procedure acording to the invention is to allow only authorized users to access the object (4) to be secured by means of a security system, even in the event of the transmitter unit (1) being lost or stolen. To this end, the transmitter unit (1) will generate an identification signal (3) characterizing the user, by means of a detector (10) scanning the user's own physical features, preferably a finger print. This identification signal (3) will then be transmitted to the security device (2). This security device can then be unlocked only if there is a match between the identification signal (3) and a stored identification signal provided by a user authorized to unlock the security device. The procedure provides a high degree of theft and/or break-in protection for lockable objects, in particular motor vehicles, and for electric or electronic devices a high degree of protection against unauthorized use.

8 Claims, 1 Drawing Sheet

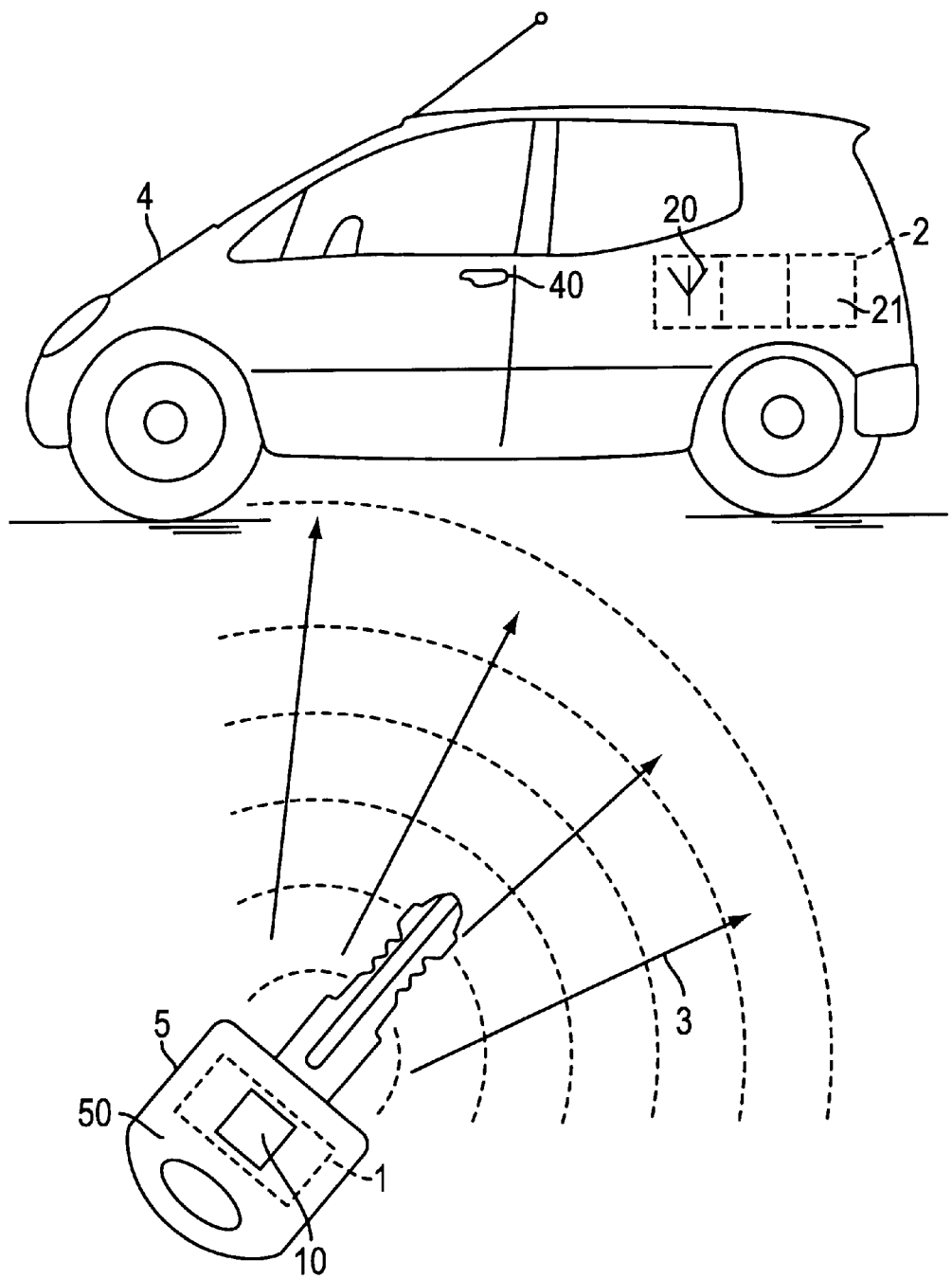
FIGURE

PROCEDURE FOR OPERATING A SECURITY SYSTEM

BACKGROUND OF THE INVENTION

The invention concerns a procedure for operating a security system having a security device which the user can unlock by use of a transmitter unit.

Such a procedure is known, for instance, from DE 35 07 389 A1. In this procedure, the security device of the security system is used to protect lockable objects against unauthorized use. The security device can be activated by means of a code signal transmitted by a transmitter unit which is worn on the person of the user, and which code signal is positively allocated to this transmitter unit. The major disadvantage of this procedure consists in that the protection of the object to be secured can no longer be guaranteed in the event of the transmitter unit being lost or stolen.

SUMMARY OF THE INVENTION

The invention is based on the task to provide a procedure for operating a security system of the type initially described, which procedure will—even in the event of the transmitter unit being lost or stolen—still allow only authorized users to access the object to be secured, and which procedure provides for maximum ease of operation by users.

The above is solved in accordance with the present invention by a procedure for operation a security system having a security device that the user can unlock by use of a transmitter unit wherein the transmitter unit scans the user's fingerprint and by use of a detector and, based on the fingerprint, generates an identifying signal characterizing the user, with the identifying signal being transmitted to the security device; and the security device is unlocked only if there is a match between the transmitted identifying signal and a stored identification signal provided by a user authorized to unlock the security device. Preferably, the transmission of the identification signal is via a wireless transmission route. Further advantageous embodiments and developments likewise are disclosed.

According to the invention, and using the user's own physical features, —preferably by means of a finger print—, it will be examined whether the user is authorized to unlock the security device, in particular an electronic drive-away protection system and/or an electrically lockable locking system of a motor vehicle to be secured.

To this end, the transmitter unit will generate an identification signal characterizing the user, by means of a detector scanning the user's own physical features. If necessary, the output signal of the detector will even be encoded. The identification signal will then be transmitted, for instance, —preferably via a wireless transmission route—as a radio signal, infrared signal, or inductive signal, to the security device where it will be compared with stored identification signals of users authorized to unlock the security device. If there is a match between the identification signal generated by the transmitter unit and one of the stored identification signals, it will be possible to unlock the security device.

Additionally, the object to be protected can be secured by means of a mechanical lock which can be unlocked by means of the correct key. Advantageously, the transmitter unit will then be integrated into the grip of this key so that, in cases where the detector scans finger prints, handling the transmitter unit becomes very easy indeed. In such cases, no further action for user identification will be required apart from operating the key.

The procedure provides a high degree of theft and/or break-in protection for lockable objects such as motor vehicles, safes, or premises; but it is also extremely well suited for securing electric and electronic equipments against unauthorized use

BRIEF DESCRIPTION OF THE DRAWING

The figure illustrates a security system for securing a motor vehicle against unauthorized use.

DESCRIPTION OF THE PREFERRED EMBODIMENTS

In the following, the invention will be described in more detail using an embodiment example and making reference to the figure attached. According to the figure, the object to be secured is a motor vehicle 4 which is to be secured against unauthorized use by means of a security system comprising a security device 2 and a transmitter unit 1. The key 5, which is provided for unlocking the locks in the vehicle doors as well as the ignition lock, features on one surface side of its grip 50 a detector 10; this is designed as a finger print detector for the scanning of finger prints. The detector 10 is a component part of a transmitter unit 1 integrated into the grip 50; this transmitter unit 1 is activated by the user operating a switch. This switch can be provided on key 5 and will be operated, for instance, by pressing on detector 10; but it can also be provided on the vehicle at the door lock 40, or the ignition lock, and will in such cases be operated by inserting the key 5 into the door lock, or the ignition lock, or turning the key 5 within this lock. This will cause an activation unit provided in motor vehicle 4 to transmit an activation signal to the transmitter unit 1 activating the same.

In an activated condition, the transmitter unit 1 will use the detector 10 to generate, from a finger print of the user, an identification signal 3 characterizing the user. This signal will then be transmitted via a wireless transmission route to reception unit 20 of the security device 2, provided in motor vehicle 4, where it will be compared with identification signals (which signals are stored in a memory unit 21) of selected users, that is, users authorized to unlock the security device 2 and to use the motor vehicle 4. If there is a match between the identification signal 3 generated by the transmission unit 1 and one of the stored identification signals, the security device 2 will then be unlocked or released for unlocking. Here, the security device 2 is provided with an electronic drive-away protection system, or an access and drive authorization system, which advantageously prevents the motor vehicle 4 from being started, as well as the locks 40 of the vehicle doors from being unlocked, by unauthorized users.

What is claimed is:

1. A method of operating a security system having a security device which the user can unlock by use of a transmitter unit, said method comprising: at the transmitter unit, scanning a finger print of the user by a detector on the transmitter and generating an identification signal characterizing the user from the detected fingerprint; transmitting the identification signal from the transmitter unit to the security device via a wireless transmission route; and, unlocking the security device only if there is a match between the identification signal transmitted by the transmitter unit and a stored identification signal provided by a user authorized to unlock the security device.

2. A method according to claim 1 wherein the step of unlocking includes comparing the transmitted identification signal in the security device to identification signals stored within a memory unit of the security device.

3. A method according to claim 2 further comprising activating the transmitter unit by the user operating a switch to generate and transmit the identification signal.

4. Use of the method according to claim 1 to secure a motor vehicle against unauthorized use.

5. Use of the method according to claim 1 to unlock an electronic drive-away protection system and/or an electrically lockable locking system of a motor vehicle.

6. A security system for implementing the method according to claim 3 comprising: a security device having stored identification signals corresponding to authorized users and unlockable in response to a received identification signal corresponding to a stored identification signal; and, a transmitter unit having a fingerprint detector for detecting a fingerprint of a user and for transmitting an identification signal corresponding to the detected fingerprint to the security device via a wireless transmission route.

7. A security system according to claim 6 wherein a lock unlockable by a key is provided as an additional security device.

8. A security system according to claim 7 wherein the transmitter unit is integrated into the grip of the key.

* * * * *